US006087075A

United States Patent [19]

Kler et al.

[11] Patent Number: 6,087,075
[45] Date of Patent: Jul. 11, 2000

[54] HOLOGRAPHIC TAMPER-EVIDENT LABEL

[75] Inventors: Edward J. Kler, Lakewood, Calif.; David W. Robbins, Oxford, Conn.; Robert R. Carey, Radnor, Pa.

[73] Assignee: Label Systems, Inc., Bridgeport, Conn.

[21] Appl. No.: 08/966,473

[22] Filed: Nov. 7, 1997

Related U.S. Application Data

[60] Provisional application No. 60/030,067, Nov. 8, 1996, abandoned.

[51] Int. Cl.[7] .............................. B42D 15/00; B32B 7/06

[52] U.S. Cl. .................................. 430/321; 430/1; 430/2; 430/320; 283/86; 283/101

[58] Field of Search .................................... 430/321, 320, 430/1, 2; 283/86, 101, 100, 91

[56] References Cited

U.S. PATENT DOCUMENTS

| | | | |
|---|---|---|---|
| 3,935,960 | 2/1976 | Cornell | 220/260 |
| 4,054,635 | 10/1977 | Sclesinger et al. | 264/219 |
| 4,121,003 | 10/1978 | Williams | 283/101 |
| 4,184,701 | 1/1980 | Franklin et al. | 283/101 |
| 4,372,649 | 2/1983 | Kellie | 430/321 |
| 4,501,439 | 2/1985 | Antes | 283/94 |
| 4,576,439 | 3/1986 | Gale et al. | 283/91 |
| 4,709,396 | 11/1987 | Vosholl et al. | 283/101 |
| 4,856,857 | 8/1989 | Takeuchi et al. | 283/86 |
| 4,906,315 | 3/1990 | McGrew | 156/231 |
| 4,921,319 | 5/1990 | Mallik | 359/2 |
| 5,044,707 | 9/1991 | Mallik | 359/2 |
| 5,085,514 | 2/1992 | Mallik et al. | 359/2 |
| 5,128,779 | 7/1992 | Mallik | 359/2 |
| 5,279,689 | 1/1994 | Svartsman et al. | 156/220 |

*Primary Examiner*—Martin Angebranndt
*Attorney, Agent, or Firm*—Clark & Brody

[57] ABSTRACT

A tamper-evident label includes two parts that are separated from each other when an article to which they are attached is opened. The two parts have matching surface relief patterns secured to each other at an interface, and the indexes of refraction of the parts are substantially equal such that the patterns have no optical effect when attached to each other. When the two parts are separated, however, the patterns generate an image drawing attention to their separation. The patterns are preferably holographic.

22 Claims, 2 Drawing Sheets

HOLOGRAPHIC TAMPER-EVIDENT LABEL

CROSS REFERENCE TO RELATED APPLICATION

This application claims the benefit of provisional application Ser. No. 60/030,067, which was filed on Nov. 8, 1996, now abandoned.

TECHNICAL FIELD

This invention relates to the art of tamper-evident labels employing elements having surface relief patterns that create visible images, such as holographic patterns. In the preferred embodiment, the invention relates to a label that is separable into two holographic elements to evidence opening of the container or tampering.

BACKGROUND

Numerous types of labels are known for indicating whether a container has been opened or subjected to tampering. These labels are known as tamper-indicating or tamper-evident labels. Each of these labels has a feature that is altered when the container is opened to indicate that the container has not remained sealed. One such label is simply a strip of paper, or other easily torn material, that bridges a joint between a container's top and the container's body. When the top is removed, the tape is severed. Another tamper-evident label, shown, in U.S. Pat. No. 3,935,960 (Cornell) uses a layer of material that changes color when it is flexed. The layer is placed on the container such that it is necessarily flexed when the container is opened to indicate tampering. Also, U.S. Pat. Nos. 4,121,003 (Williams) and 4,184701 (Franklin) show labels that indicate tampering by providing the label with an adhesive that contains information, parts of the adhesive remaining on both the portion of the label staying on the article and the portion of the label that is detached.

It is also known to use labels that are difficult to produce, such as those having holograms, to authenticate an article. For example, U.S. Pat. No. 4,501,439 (Antes) discloses a hologram attached to an article for authenticating the article, the image generated by the hologram being read only by a specially-designed instrument. U.S. Pat. Nos. 4,921,319; 5,044,707; and 5,085,514 (Mallik) also show authenticating holograms, which allow documents such as passports to be viewed through the hologram.

SUMMARY OF THE INVENTION

In accordance with the invention, a product particularly useful as a tamper-evident label includes elements with surface relief patterns that are capable of producing optical images when illuminated with light. The label is placed on the container initially such that the relationship between the elements precludes generation of the images. This relationship, however, is necessarily disturbed when the container is opened or the label removed, whereby the images are readily viewed to indicate that the container has been opened.

In the preferred embodiment, the surface relief patterns are holographic, but non-holographic patterns are also contemplated. The patterns may be generated in a variety of ways, including photographic recordation of interference or other patterns and computer generation. A first one of the elements is preferably made of a curable resin that is cast and cured, for example, by actinic or other radiation, including electron beam irradiation and thermal radiation. Such techniques for production of a hologram are known in the art. Alternatively, the first element is hard embossed, etched or engraved with known photographic or other techniques. The second element is preferably formed by applying a material in liquid form to the surface relief of the first element, whereby it forms a replica of the surface relief pattern on the first element. The materials used for the two elements are preferably transparent and have substantially the same indexes of refraction, whereby no image is visible when the elements are in this initial configuration because there is no diffraction at the interface between the two matching patterns.

The material used for the first element includes a release agent that allows the second element to be detached from the first element while retaining the surface relief pattern. Thus, when the second element is detached from the first element, each of the elements has the same surface relief pattern thereon, and each is capable of forming an image. For example, if the surface relief pattern is capable of creating an image of the word "void," detachment of the second element from the first results in separate elements each having "void" easily visible thereon.

The label may have printing on other of its surfaces. For example, the second element may carry on its bottom surface a printed label indicating the contents of the container. Preferably, however, the bottom surface carries a second hologram. The image generated by the second hologram is visible when the first element is attached because the matched indexes of refraction of the two elements prevents formation of images by the holograms forming the interface between the elements.

DETAILED DESCRIPTION OF THE INVENTION

Figure 1:
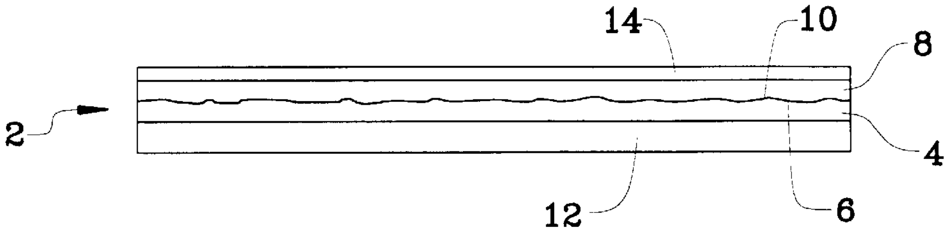
FIG. 1 is a side view of a tamper-evident label in accordance with the invention.

With reference to FIG. 1 of the drawings, a tamper-evident label 2 in accordance with the invention includes a first element 8 having a polyester layer 14 as a carrier substrate. The lower surface 10 of this first element is provided with a holographic surface relief pattern capable of generating a holographic image, for example, of the word "void." Holographic element 8 is preferably formed in a known manner by casting a resin with the desired holographic pattern, and curing that resin by illumination with actinic radiation. Such a procedure is disclosed, for example, in U.S. Pat. No. 5,085,514. The resin used in the present invention, however, differs from that generally known by the addition of acrylic functional polyester modified dimethyl polysiloxane, which acts as a release agent, A second element 4 is formed on the surface 10 of element 8 after curing such that the upper surface 6 of the element 4 flows into the surface relief on surface 10 to form a replica of the pattern on surface 10. The material used for the second element is preferably one that pours like a liquid but is "100% solids." That is, this material changes from a liquid to a solid only by polymerization because it does not contain any volatile components. The material used for the element 4 is essentially the same as that used for element 8, but does not necessarily contain the acrylic functional polyester modified dimethyl polysiloxane. The material forming the second element is then cured by illumination with actinic radiation.

The label 2 is completed by the addition of an adhesive layer 12, for attaching the label to a product. A polyester layer 14 is used as the carrier substrate and to provide protection of the label.

Preferred compositions for the two materials are set forth in the following table.

TABLE 1

| | COMPOSITION OF ELEMENT 8 (wt. %) | COMPOSITION OF ELEMENT 4 (wt. %) |
|---|---|---|
| Multifunctional Acrylate Monomer and Oligomer | 80 | 85 |
| Photoinitiator Blend | 12 | 13 |
| Surfactant | 2 | 2 |
| Acrylic Functional Polyester Modified Dimethyl Polysiloxane | 6 | |

In the compositions set forth above, the amount of the acrylic functional polyester modified dimethyl polysiloxane may be from 1% to 10% in one or both of the elements. The preferred compound is sold under the designation "BYK-371" and may be obtained from BYK-Chemie, USA. The first three components may be the known commercial product "Radkote 801."

It is within the contemplation of the invention that other types of curable resins could be used, including acrylates, polyesters, epoxies, vinyls, and silicones.

Figure 2:
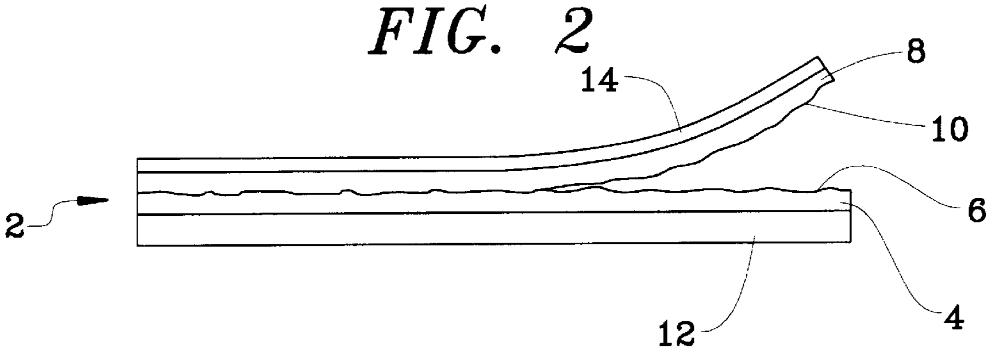
FIG. 2 is a side view of the label of FIG. 1 with the two elements partly detached.

The addition of the acrylic functional polyester modified dimethyl polysiloxane allows the second element to be detached from the first element while preserving the surface relief patterns on the surfaces 6 and 10. As illustrated in FIG. 2, the first element 8 and its protective layer 14 have been pulled from the second element 4. The surface relief patterns 6 and 10 have been separated but have retained their original forms, pattern 6 being a replica of the pattern 10.

The materials from which elements 4 and 8 are formed have substantially equal optical indexes of refraction. Thus, when the elements 4 and 8 are in contact as shown in FIG. 1, light passes through the interface without deviation, and the patterns, thus, do not generate an image. When the two elements are separated, however, as shown in FIG. 2, the surface relief patterns are exposed to air, permitting diffraction and the consequent formation of images.

Figure 3:
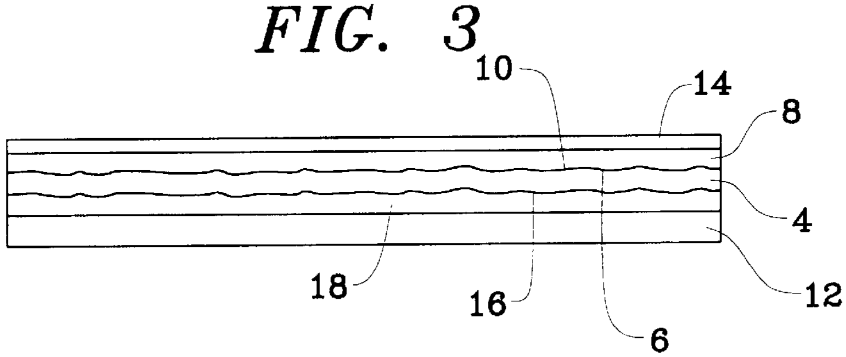
FIG. 3 is a side view of a second embodiment of a tamper-evident label in accordance with the invention.

FIG. 3 illustrates a second embodiment of the invention. In accordance with this embodiment, the lower surface of the element 4 is provided with a second surface relief pattern 16. The pattern 16 is preferably a holographic pattern. In addition, a metal layer 18 is applied to the pattern 16 whereby the image generated by the pattern is easily visible. For example, the image generated by the pattern 16 may contain information about the product to which the label is attached and be designed artistically to attract attention to the product.

The second surface relief pattern 16 is applied to the element 4 in substantially the same manner as is the pattern 10.

Figure 4:
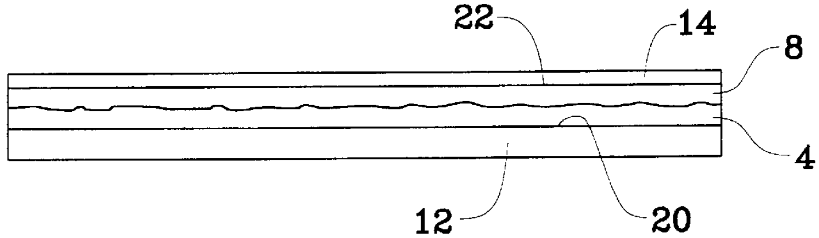
FIG. 4 is a side view of a third embodiment of a tamper-evident label in accordance with the invention.

FIG. 4 illustrates yet another embodiment wherein the lower surface of element 4 includes a printed pattern 20, which has been applied with any of several known techniques. The upper surface of element 8 contains a printed pattern 22, as well. When the first and second elements are attached as shown in FIG. 4, the printed patterns 20 and 22 are easily viewed. It will be appreciated that the embodiment of FIG. 4 may instead have only one of the printed patterns.

Figure 5:
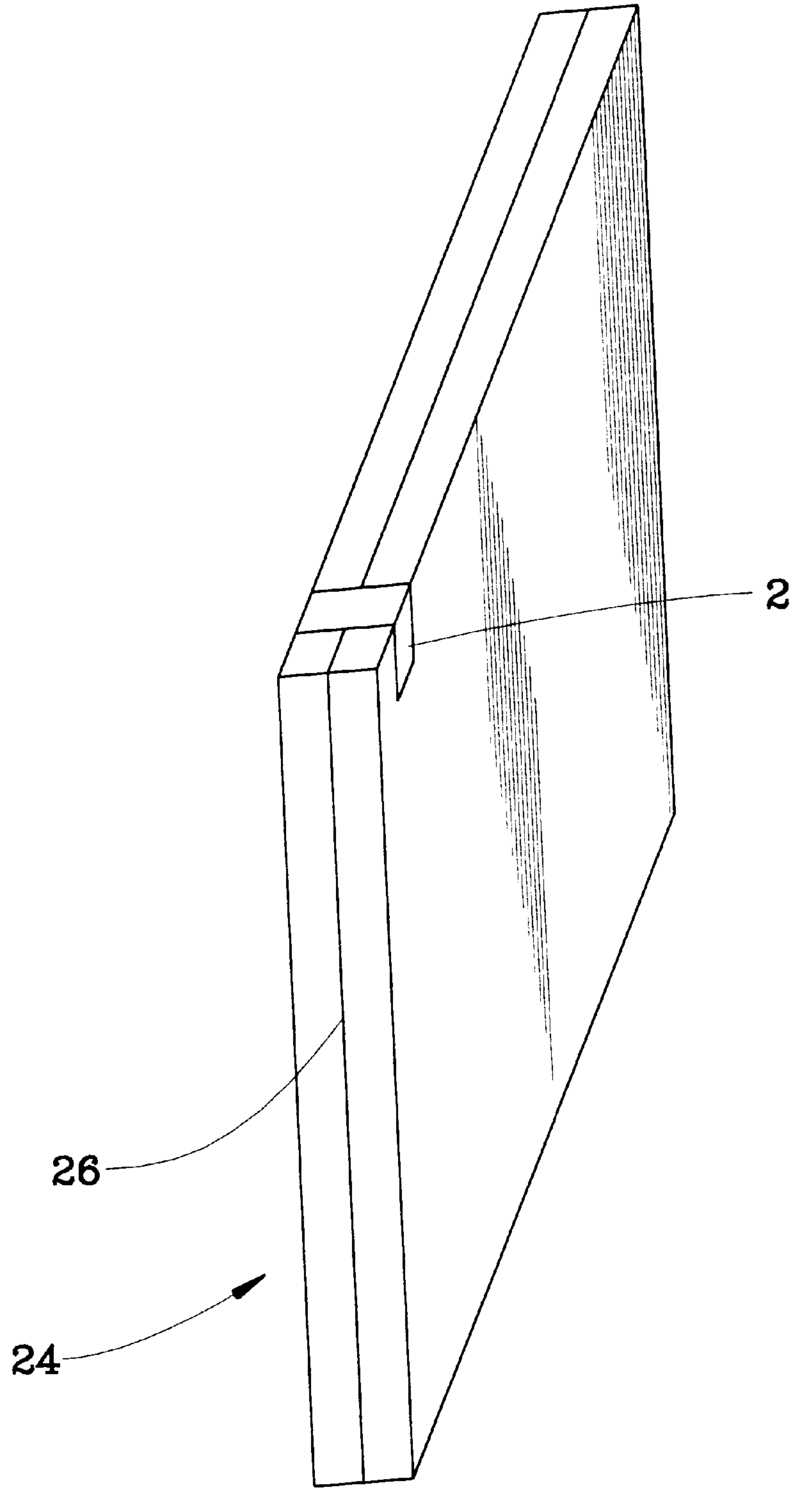
FIG. 5 is a perspective of a container having thereon a tamper-evident label in accordance with the invention.

FIG. 5 illustrates the application of a label in accordance with the invention to a container. In the illustrated application, the container 24 is a CD-ROM container commonly known as a "jewel box." The label 2 is attached to the container such that it spans the joint 26 between the separable parts of the container. In this example, the polyester layer 14 is rather thick and strong to prevent opening the container without first removing that layer. The second layer 4 and the metal layer 18, however, are quite thin, e.g., 2 microns, whereby once the layer 14 and first element 8 are removed, the parts of the container are easily separated. Thus, the container is effectively sealed until the polyester layer is removed, which exposes the word "void" on the two elements.

It will be appreciated that a unique label and method for its manufacture have been described. Modifications within the scope of the appended claims will be apparent to those of skill in the art.

We claim:

1. A label providing a visual indication of an action taken with respect to an article comprising in combination:

a first element made of a first material having a surface with a first surface relief pattern thereon, and a second element made of a second material having a surface with a second surface relief pattern thereon, wherein at least one of said first and second materials is transparent and said first and second elements are attached to each other at an interface including said first and second surface relief patterns resulting in a label without a pattern due to said first and second relief patterns, but are capable of being detached along said interface while maintaining the integrity of said first and second surface relief patterns, said first and second surface relief patterns are capable of forming visible images when separated and illuminated by light, said second surface relief pattern is a replica of said first surface relief pattern, and the refractive indices of said first and second transparent materials are such that said surface relief patterns will not form said visible images when said first and second elements are attached at said interface and will form said visible images when said first and second elements are detached, and further comprising an adhesive means for attaching said first and second elements to an article such that said action detaches said first element from said second element.

2. A combination according to claim 1 wherein said first and second surface relief patterns are holographic patterns.

3. A combination according to claim 1 wherein at least one of said first and second surface relief patterns is an etched pattern.

4. A combination according to claim 1 wherein at least one of said first and second surface relief patterns is an engraved pattern.

5. A combination according to claim 1 wherein said first material comprises a cured liquid resin.

6. A combination according to claim 5 wherein said second material comprises a cured liquid resin.

7. A combination according to claim 1 wherein at least one of said first and second materials contains a release agent for facilitating detachment of said elements.

8. A combination according to claim 1 in further combination with said article, wherein said article comprises two separable parts, and said first and second elements are arranged such that said elements are detached when said separable parts are separated.

9. A combination according to claim 1 further comprising a printed pattern on one of said first or second elements.

10. A combination according to claim 1 wherein said first and second materials are transparent.

11. In combination:

a first element made of a first material having a surface with a first surface relief pattern thereon, and a second element made of a second material having a surface with a second surface relief pattern thereon, wherein at least one of said first and second materials is transparent and said first and second elements are attached to each other at an interface including said first and second surface relief patterns but are capable of being detached along said interface while maintaining the integrity of said first and second surface relief patterns, said first and second surface relief patterns are capable of forming visible images when illuminated by light, said second surface relief pattern is a replica of said first surface relief pattern, and the refractive indices of said first and second transparent materials are such that said surface relief patterns will not form said visible images when said first and second elements are attached at said interface and will form said visible images when said first and second elements are detached and at least one of said first and second materials contains a release agent comprising acrylic functional polyester modified dimethyl polysiloxane.

12. A combination according to claim 11 wherein the amount of said acrylic functional polyester modified dimethyl polysiloxane comprises from one to ten weight percent of said first or second transparent materials.

13. A combination according to claim 12 wherein said acrylic functional polyester modified dimethyl polysiloxane comprises six weight percent of said first or second transparent materials.

14. A process for production of a tamper-evident label comprising the steps of:

forming a first element having a first relief pattern on a first surface of said first element, said relief pattern being capable of generating an image when illuminated by a beam of light, forming a second element having a second relief pattern on a second surface of said second element, said second relief pattern being a replica of said first surface relief pattern and being capable of generating an image when illuminated by a beam of light, and attaching said first and second elements to each other at an interface containing said first and second surface relief patterns such that said elements may be detached while retaining said surface relief patterns to reconstruct respective visible images, and attaching to said first or second elements an adhesive means for attaching said first and second elements to an article in such a manner that tampering with said article detaches said first element from said second element, wherein said first and second elements are made of materials having substantially identical refractive indices and said tamper-evident label has substantially no effect on a light beam illuminating said tamper-evident label due to said first and second relief patterns.

15. A process according to claim 14 wherein said first and second surface relief patterns are holographic patterns.

16. A process according to claim 14 wherein at least one of said first and second surface relief patterns is made by etching.

17. A process according to claim 14 wherein at least one of said first and second surface relief patterns is made by engraving.

18. A process according to claim 14 wherein at least one of said first and second elements is made of a material that is cured by actinic radiation.

19. A process according to claim 14 wherein at least one of said first and second elements is made of a material that is cured by e-beam radiation.

20. A process according to claim 14 wherein at least one of said first and second elements is made of a material that is cured by thermal radiation.

21. A process according to claim 14 further comprising the step of applying said first and second elements to an article having separable parts in such a manner that separation of said parts detaches said first element from said second element.

22. A process according to claim 14 wherein said second element is formed on said first surface by applying to said first surface a material that flows into said first relief pattern to form a replica thereof.

* * * * *